US006249388B1

(12) United States Patent
Kanai (10) Patent No.: US 6,249,388 B1
(45) Date of Patent: Jun. 19, 2001

(54) EYEPIECE LENS SYSTEM

(75) Inventor: Moriyasu Kanai, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,593

(22) Filed: Oct. 27, 1999

(30) Foreign Application Priority Data

Oct. 29, 1998 (JP) .................................................. 10-308479

(51) Int. Cl.$^7$ .................................................. G02B 25/00
(52) U.S. Cl. ............................................. 359/646; 359/643
(58) Field of Search .................................. 359/643, 646, 359/644, 645

(56) References Cited

U.S. PATENT DOCUMENTS 6,064,530 * 5/2000 Yano ..................................... 359/645

OTHER PUBLICATIONS

Y. Shotaro, "Telescope Optics and Refraction for Amateur Astronomers", Seibundo Shinkosha Co. Ltd., Japan (Dec. 1989) pp. 209–210.

\* cited by examiner

Primary Examiner—Georgia Epps
Assistant Examiner—David N. Spector
(74) Attorney, Agent, or Firm—Greenblum & Bernstein, P.L.C.

(57) ABSTRACT

A negative ocular having a positive eye-side lens element positioned on the side of the user's eye and a positive field lens element positioned on the side of the object whereby an intermediate image formed by an objective lens system is formed between the eye-side lens element and the field lens element, and whereby the eyepiece lens system satisfies the following conditions:

$$0.8 < L(1+S)/\{f_1(P+S)\} < 1.05 \quad (1)$$

$$0.5 < S(1 - 1/P)/(1+S) \quad (2)$$

wherein

$S = v_1/v_2; \quad P = f_2/f_1;$

$f_1$ designates the focal length of the eye-side lens element; $f_2$ designates the focal length of the field lens element; $v_1$ designates the Abbe number of the eye-side lens element; $v_2$ designates the Abbe number of the field lens element; and L designates the distance between the principal points of the field lens element and the eye-side lens element.

4 Claims, 11 Drawing Sheets

Eye Relief of a Lens System Having Thin Lens Elements Normalized by The Focal Length (er/f)

Fig.10B

The Distance Between the Principal Points Normalized by The Focal Length (L0/f)

— — — Axial Ray
——— Off-axis Ray
— - — - — Off-axis Paraxial Principal Ray

EYEPIECE LENS SYSTEM

BACKGROUND OF THE INVENTION

1. Field of the Invention

The present invention relates to a negative ocular (an inner-focusing type eyepiece lens system) with two lens elements, which is used in combination with an objective lens system of a telescope or binoculars.

2. Description of the Related Art

In a two-lens-element eyepiece lens system having a lens element on the user's eye side (hereinafter, an eye-side lens element) and a field lens element on the object side, some types of eyepiece lens systems are known in the art, such as a Ramsden eyepiece lens system (hereinafter, the R-type), a Huygenian eyepiece lens system (hereinafter, the H-type), and a Mittenzwey-Huygenian eyepiece lens system (hereinafter, the MH-type) in which the field lens element of the H-type is formed into the shape of a meniscus lens element. The R-type eyepiece lens system is an outer-focusing eyepiece lens system in which the eye-side lens element and the field lens element are provided with the same amount of positive power, and are symmetrically positioned. An intermediate image formed by an objective lens system is positioned (formed) at the outer side (the object side) of the field lens element. Moreover, in the R-type eyepiece lens system, lateral chromatic aberration can be corrected by the following condition:

$f_1:f_2:L=1:1:1$ wherein $f_1$ designates the focal length of the eye-side lens element;
$f_2$ designates the focal length of the field lens element; and
L designates the distance between the principal points of the eye-side lens element and the field lens element.

It is noted that the inner-focusing type eyepiece lens system is hereinafter referred to as a negative ocular in which the intermediate image is formed between the field lens element and the eye side lens element; and the outer-focusing eyepiece lens system is hereinafter referred to as a positive ocular in which the intermediate image is formed outside of the field lens element and the eye side lens element.

The H-type eyepiece lens system is a negative ocular in which the eye-side lens element and the field lens element are planoconvex lens elements which are made from the same lens material, and the convex surfaces face towards the object. An intermediate image formed by an objective lens system is positioned (formed) between the eye-side lens element and the field lens element. Moreover, in the H-type eyepiece lens system, lateral chromatic aberration can be corrected by the following condition:

$f_1:L:f_2=1:2:3$; or $f_1:L:f_2=2:3:4$ wherein $f_1$ designates the focal length of the eye-side lens element;
$f_2$ designates the focal length of the field lens element; and
L designates the distance between the principal points of the eye-side lens element and the field lens element. ("Telescopic Optics & Refraction for Amateur Astronomers" by Yoshida Shotaro)

In the MH-type eyepiece lens system, the field lens element of the H-type is formed into the shape of a meniscus lens element so that a field of view becomes wider than that of the H-type. On the other hand, the conditions for correcting lateral chromatic aberration are the same as those of the H-type.

In the R-type eyepiece lens system, since the field lens element is positioned where the intermediate image formed by the objective optical system is formed, dust and other foreign matter tend to be noticeable. Consequently, the field lens element and the eye-side lens element can not be positioned to satisfy the conditions for correcting lateral chromatic aberration. In the H-type eyepiece lens system, and the HM-type eyepiece lens system, the eye relief (the distance from the eye-side surface of the eye-side lens element to the eyepoint) is about 0.2 f to 0.3 f (f: the focal length of the entire eyepiece lens system), which is extremely short. Therefore in an eyepiece lens system with a short focal length, it is very difficult for a user to obtain a clear image.

SUMMARY OF THE INVENTION

It is an object of the present invention to provide an eyepiece lens system in which the eye relief is more than 0.4 f, lateral chromatic aberration is suitably corrected, and the apparent visual angle is about 40° while the eyepiece lens system maintains a basic two-lens-element arrangement.

In order to achieve the above-mentioned object, there is provided a negative ocular having a positive eye-side lens element positioned on the side of the user's eye and a positive field lens element positioned on the side of the object whereby an intermediate image formed by an objective lens system is formed between the eye-side lens element and the field lens element, and whereby the eyepiece lens system satisfies the following conditions:

$$0.8 < L(1+S)/\{f_1(P+S)\} < 1.05 \quad (1)$$

$$0.5 < S(1-1/P)/(1+S) \quad (2)$$

wherein $S=v_1/v_2$;

$P=f_2/f_1$;

$f_1$ designates the focal length of the eye-side lens element;
$f_2$ designates the focal length of the field lens element;
$v_1$ designates the Abbe number of the eye-side lens element;
$v_2$ designates the Abbe number of the field lens element; and
L designates the distance between the principal points of the field lens element and the eye-side lens element.

The field lens element is preferably a meniscus lens element having the convex surface facing towards the object; and the meniscus lens element satisfies the following condition:

$$0.7 < r_3/r_4 < 1.4 \quad (3)$$

wherein $r_3$ designates the radius of curvature of the eye-side surface of the field lens element; and
$r_4$ designates the radius of curvature of the object-side surface of the field lens element.

Figure 11:
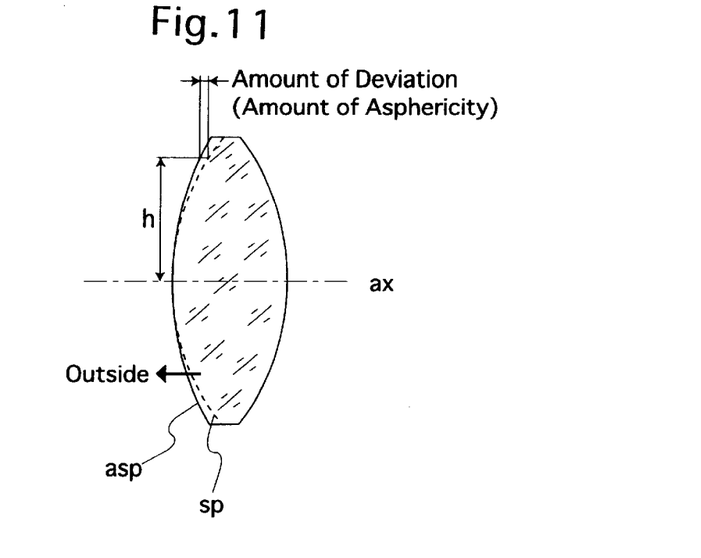
FIG. 11 is a side elevation of the eye-side lens element on which the aspherical surface is formed.

As shown in FIG. 11, the eye-side lens element includes at least one an aspherical surface. The aspherical surface "asp" is preferably formed to deviate towards the outside from the paraxial spherical surface "sp" which is considered to be a reference surface, and the amount of deviation (i.e., the amount of asphericity) increases along with an increase of the height "h" from the optical axis "ax".

With respect to the values of the above-mentioned 'S' defined by $v_1/v_2$, if the following condition is satisfied, the eye relief can be made longer:

$$1.9 < S \qquad (4)$$

The present disclosure relates to subject matter contained in Japanese Patent Application No.Hei-10-308479 (filed on Oct. 29, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
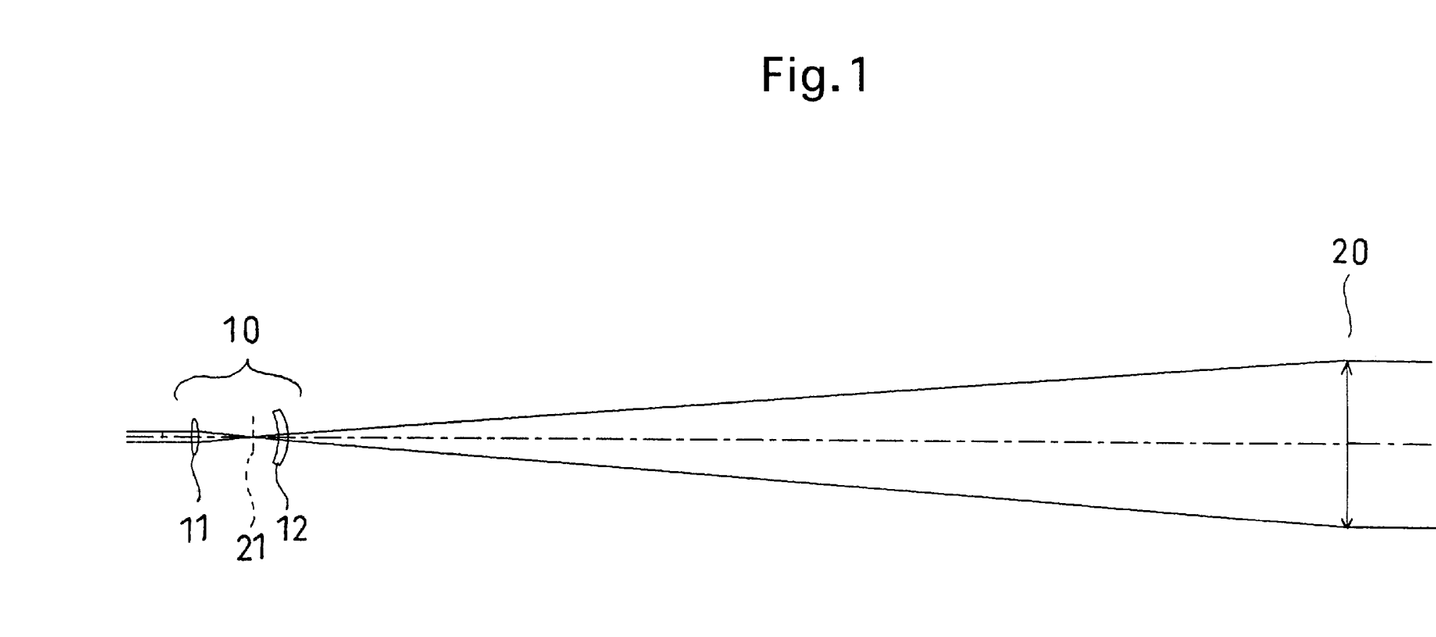
FIG. 1 is a first embodiment of an eyepiece lens system; and in a lens arrangement of FIG. 1, a combination of the eyepiece lens system and an objective lens system is shown.
Figure 4:
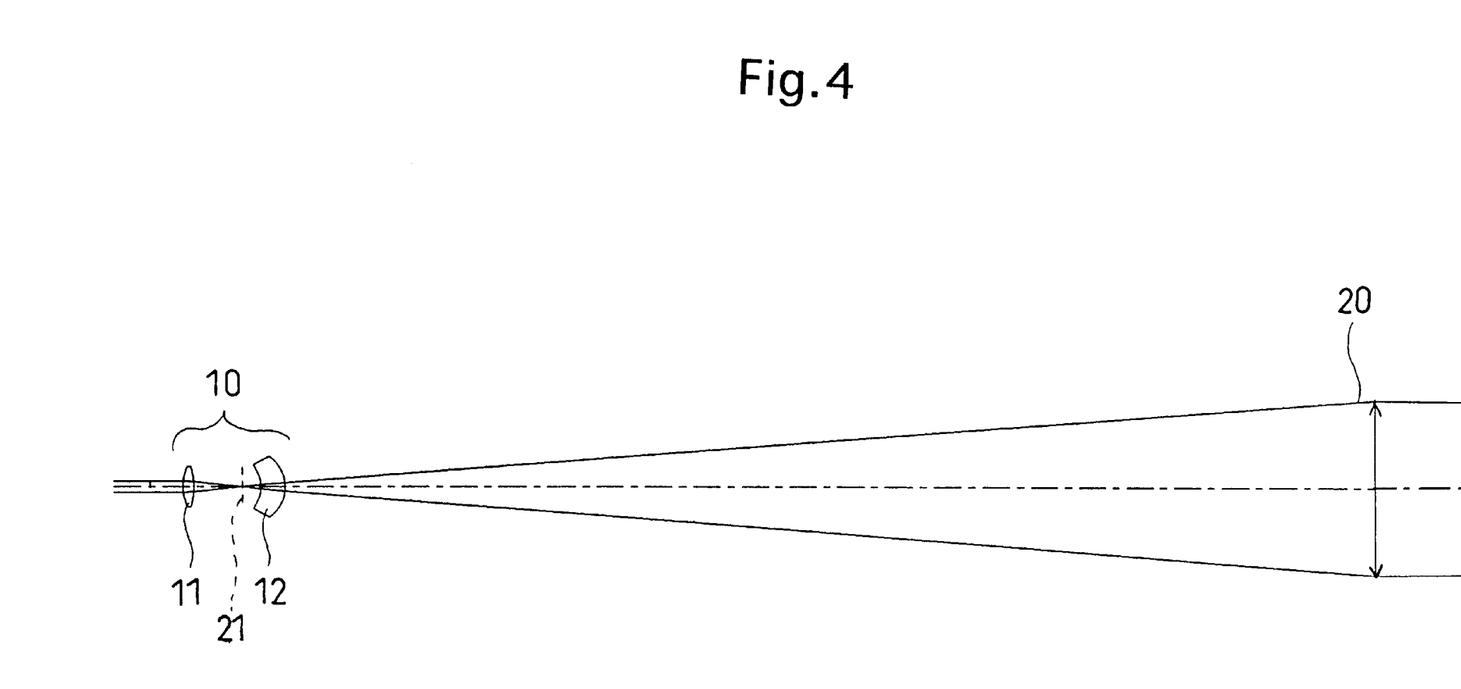
FIG. 4 is a second embodiment of an eyepiece lens system; and in a lens arrangement of FIG. 4, a combination of the eyepiece lens system and an objective lens system is shown.
Figure 7:
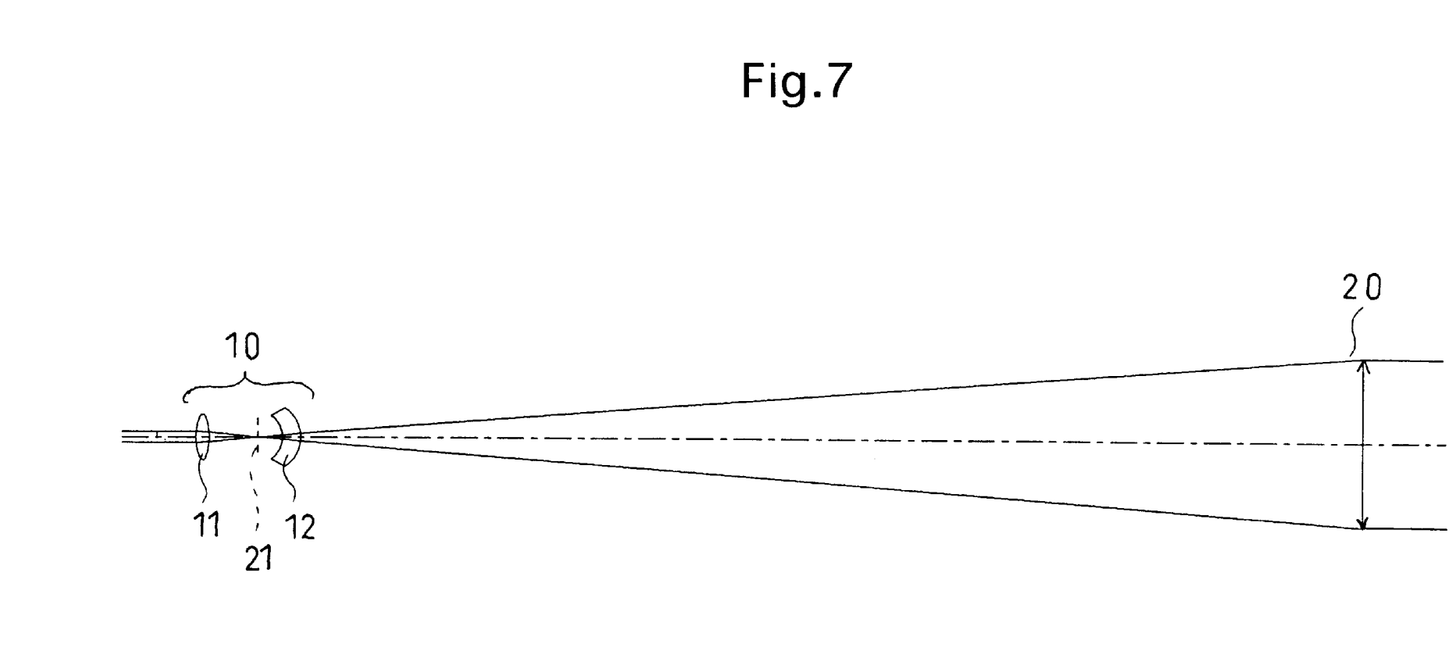
FIG. 7 is a third embodiment of an eyepiece lens system; and in a lens arrangement of FIG. 7, a combination of the eyepiece lens system and an objective lens system is shown.

FIGS. 1, 4 and 7 respectively show a first, second and third embodiment of a negative ocular. A lens arrangement shown in each figure indicates a combination of an eyepiece lens system 10 and an objective lens system 20. The eyepiece lens system 10 includes a positive eye-side lens element 11 which is positioned on the side of the user's eye, and a positive meniscus lens element 12 (the field lens element) which is positioned on the side of an object (i.e., on the side of the objective lens system 20) and has a convex surface facing towards the object. An intermediate image 21 which is formed by the objective lens system 20 is positioned between the eye-side lens element 11 and the meniscus lens element 12.

In each embodiment, with respect to the eye-side lens element and the field lens element, a particular relationship among the focal lengths, the Abbe numbers, and the distance between the principal points, is explained. The relationship is found effective (i) to maintain an eye relief of more than 0.4 f, (ii) to correct lateral chromatic aberration adequately, and (iii) to increase the apparent visual angle up to about 40°, in a negative ocular having a two-lens-element arrangement including the positive eye-side lens element positioned on the side of the user's eye, and the positive field lens element positioned on the side of the object, and whereby an intermediate image is formed by the objective lens system is positioned between the eye-side lens element and the field lens element.

Condition (1) is for correcting lateral chromatic aberration adequately. More concretely, a condition to correct lateral chromatic aberration in the paraxial region through two positive lens elements can be described as the following sub-condition:

$$L(1+S)/\{f_1(P+S)\}=1 \qquad (1\text{-}2)$$

wherein the entrance pupil of the eyepiece lens system is assumed to be at infinity;

$S=v_1/v_2$;

$P=f_2/f_1$;

$f_1$ designates the focal length of the eye-side lens element;

$f_2$ designates the focal length of the field lens element;

$v_1$ designates the Abbe number of the eye-side lens element;

$v_2$ designates the Abbe number of the field lens element; and

L designates the distance between the principal points of the field lens element and the eye-side lens element.

With respect to the entrance pupil of the eyepiece lens system, the assumption is appropriate because generally the focal length of an objective lens system for telescopes and binoculars is sufficiently long in comparison with the focal length of the eyepiece lens system, and therefore the entrance pupil of the eyepiece lens system can be considered to be at infinity.

Adequacy of sub-condition (1-2) is also apparent from the conditions for correcting lateral chromatic aberration in the above mentioned H-type eyepiece lens system:

$f_1:L:f_2=1:2:3$; or $f_1:L:f_2=2:3:4$

In this case, since the eye-side lens element and the field lens element are made of the same lens material, S=1.

As explained, sub-condition (1-2) is for correcting lateral chromatic aberration; however, if an apparent visual angle increases, there are some cases where it is not preferable to strictly apply sub-condition (1-2) in order to perform the correcting of distortion and the like together with lateral chromatic aberration in a balanced manner. The upper and lower limits of condition (1) are therefore determined in order to correct lateral chromatic aberration and other aberrations in a balanced manner. If $L(1+S)/\{f_1(P+S)\}$ exceeds the lower limit of condition (1), the correcting of lateral chromatic aberration becomes insufficient. If L(1+S)/{f₁(P+S)} exceeds the upper limit of condition (1), lateral chromatic aberration is over-corrected.

Figure 12:
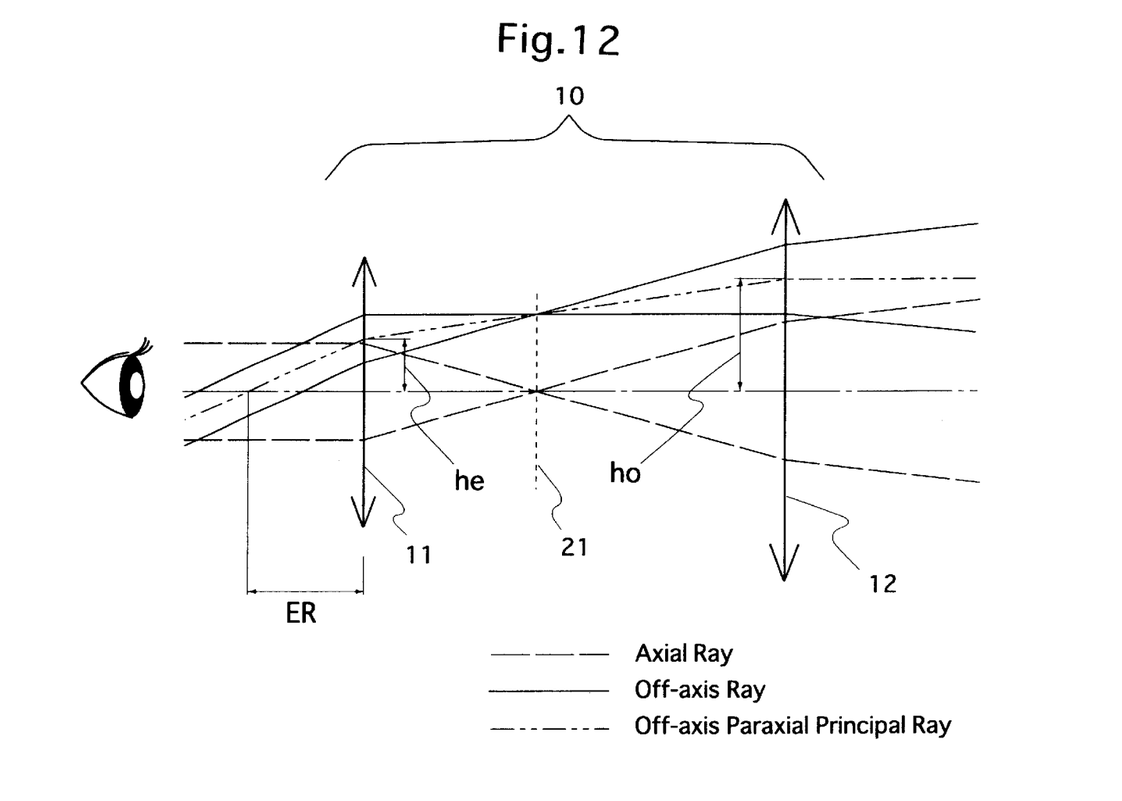
FIG. 12 is an explanatory view for sub-condition (1-2).

Condition (2) is for maintaining a longer eye relief. More concretely, a position of the exit pupil (eyepoint) of an off-axis principal ray in the paraxial region (hereinafter, an off-axis-paraxial principal ray) is considered, under the conditions that (i) sub-condition (1-2) is satisfied, (ii) the entrance pupil of the eyepiece lens system is at infinity, and (iii) the eye-side lens element and the field lens elements are thin lens elements. Here, sub-condition (1-2) is satisfied, and a ratio $h_e/h_o$ is calculated; wherein, as shown in FIG. 12, $h_o$ designates the height of an off-axis-paraxial principal ray to be incident on the field lens element, and he designates the height of the off-axis-paraxial principal ray to be emitted from the eye-side lens element. The result of these calculations is equal to the right side of condition (2). Further, the right side of condition (2) multiplied by the entire focal length of the eyepiece lens system is equal to an eye relief (ER) for a lens system including thin lens elements as shown in the following sub-condition:

$$ER=(h_e/h_o)f=S(1-1/P)f/(1+S) \qquad (2\text{---}2)$$

However, an actual lens element has a certain thickness, and on a lens surface where an emission angle is large, distortion in the positive direction occurs, and thereby an actual eye relief (ER) is smaller than the value obtained in sub-condition (2—2). Accordingly, the necessary condition to obtain an actual eye relief of more than 0.4 f is condition (2) which specifies that an eye relief for a lens element having thin lens element is more than 0.5 f.

Condition (3) is for the miniaturization of the eyepiece lens system. More concretely, under the condition that the distance between the principal points of the field lens and the eye-side lens element satisfies sub-condition (1-2), the following sub-condition is obtained by substituting L0 for L, and by leaving L0 on the left side of the equation:

$$L0=f_1(P+S)/(1+S) \qquad (1\text{-}3)$$

Figure 10A:
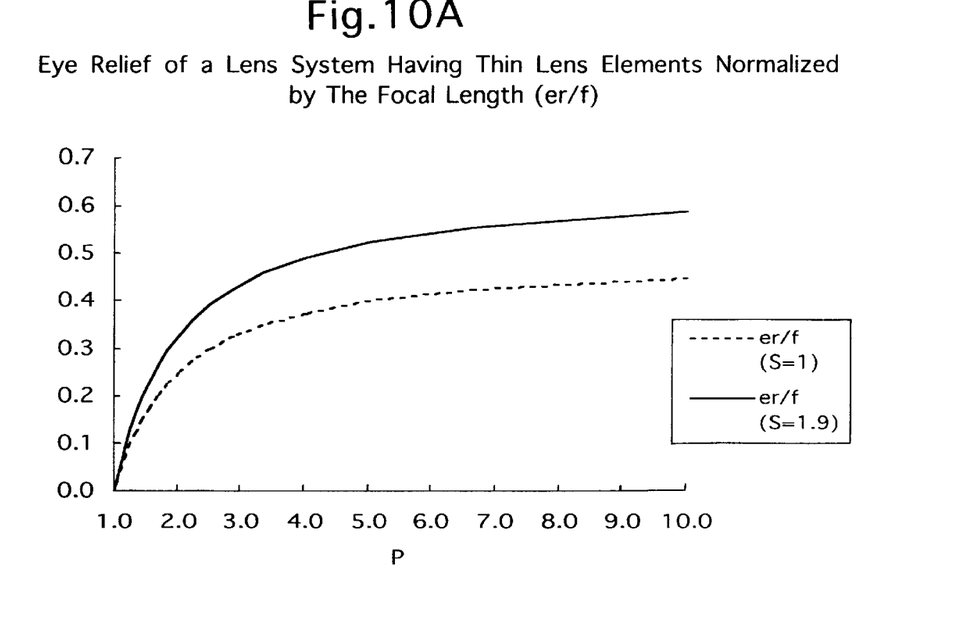
FIG. 10A is a graph showing the relationship between he values of 'S' and the eye relief with respect to the eyepiece lens system.
Figure 10B:
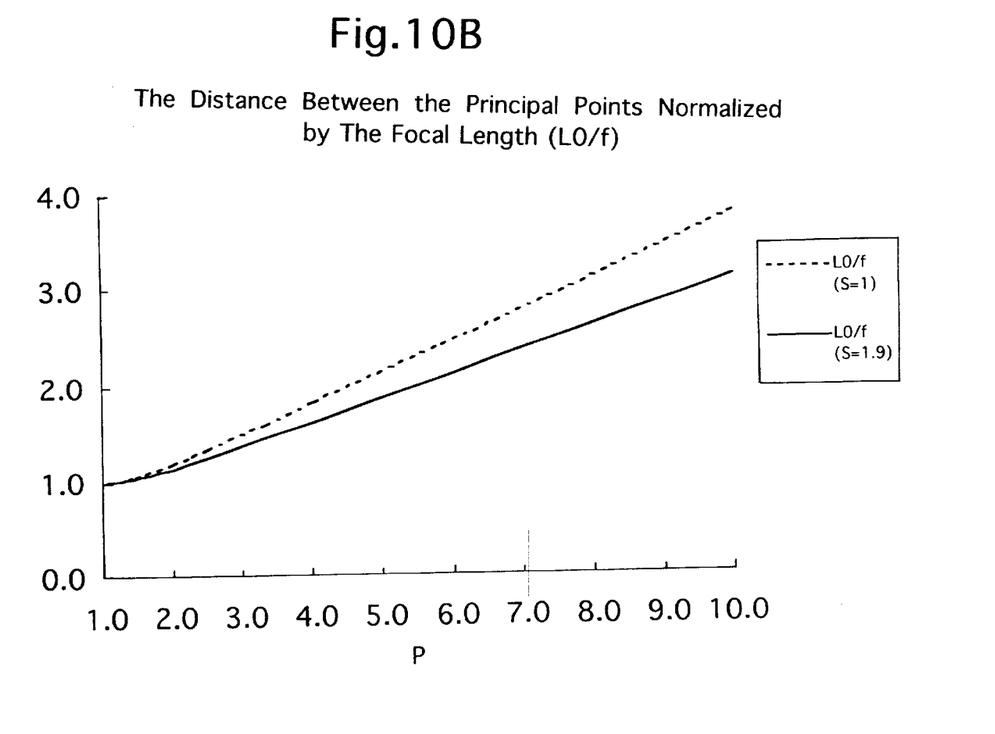
FIG. 10B is a graph showing the relationship between the values of 'S' and the distance between the principal points with respect to the eyepiece lens system.

As shown in the graph of FIG. 10A, if the eye relief for a lens system having thin lens elements is intended to increase, the value of P is made larger accordingly. However, if the value of P increases, the distance between the principal points L0 is also made longer as shown in FIG. 10(B) and sub-condition (1-3).

If the field lens element is formed as a meniscus lens element satisfying condition (3), the eye-side principal point of the field lens element is moved towards the object (in a direction away from the eye-side lens element), whereby the actual entire length of the eyepiece lens system (the distance between the field lens element and the eye-side lens element) can be maintained shorter even if the distance between the principal points L0 is made longer.

Furthermore, in the field lens element, if the shape thereof is determined so that condition (3) is satisfied, the Petzval sum is made smaller, and thereby field curvature can be corrected. Then, through condition (3), the shape of the 'meniscus' field lens element is specified, the position of the eye-side principal point of the filed lens element is moved towards the object while the positive power of the field lens element is maintained, and further, the actual distance between the field lens element and the eye-side lens element is maintained shorter, and thereby the Petzval sum can be made smaller, and field curvature can be corrected.

If $r_3/r_4$ exceeds the lower limit of condition (3), the radius of curvatures $r_3$ and $r_4$ become too small, so that coma occurs if an emission angle becomes larger. If $r_3/r_4$ exceeds the upper limit of condition (3), the eye relief cannot be made longer, so that the Petzval sum increases, and field curvature increases accordingly.

On the other hand, as explained in FIG. 12, the eye-side lens element includes at least one an aspherical surface. The aspherical surface "asp" is preferably formed to deviate towards the outside from the paraxial spherical surface "sp" which is considered to be a reference surface, and the amount of deviation (i.e., the amount of asphericity) increases along with an increase of the height "h" from the optical axis "ax". If the value of the right side of condition (2) becomes larger, i.e., the height ($h_e$) of the off-axis-paraxial principal ray to be emitted from the eye-side lens element becomes higher, field curvature on the meridional image surface at the periphery of the eye-side lens element becomes larger, and distortion also becomes larger. Therefore by forming at least one aspherical surface on the eye-side lens element, power along the meridional direction is weakened, and thereby field curvature on the meridional image surface can be corrected, and distortion can also be corrected.

Condition (4) is for maintaining a longer eye relief of the eyepiece lens system. As can be understood from FIG. 10A, the larger the value of S is, the longer the eye relief becomes. By satisfying condition (4), an actual eye relief of more than 0.5 f can be maintained while the entire length of the eyepiece lens system can be maintained shorter. From FIG. 10A, for example, when S=1, even at P=10, the eye relief for a lens system having thin lens elements is at most about 0.45 f; on the other hand, when S=1.9, an eye relief becomes 0.59 f at P=10. This means that a longer eye relief can be obtained through condition (4).

Specific numerical examples will herein be discussed. In the tables and diagrams, f designates the focal length, B designates the apparent visual angle (half apparent visual angle)(°), ER designates the eye relief (mm), R designates the radius of curvature, D designates the lens thickness or space between lens elements, N designates the refractive index of a lens element with respect to the d-line, and ν designates the Abbe number. In the diagrams of chromatic aberration represented by spherical aberrations, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}\ldots;$$

wherein:
x designates a distance from a tangent plane of an aspherical vertex;
C designates a curvature of the aspherical vertex (1/R);
h designates a distance from the optical axis;
K designates the conic coefficient; and A4 designates a fourth-order aspherical coefficient;

A6 designates a sixth-order aspherical coefficient;

A8 designates a eighth-order aspherical coefficient;

[Embodiment 1]

Figure 2:
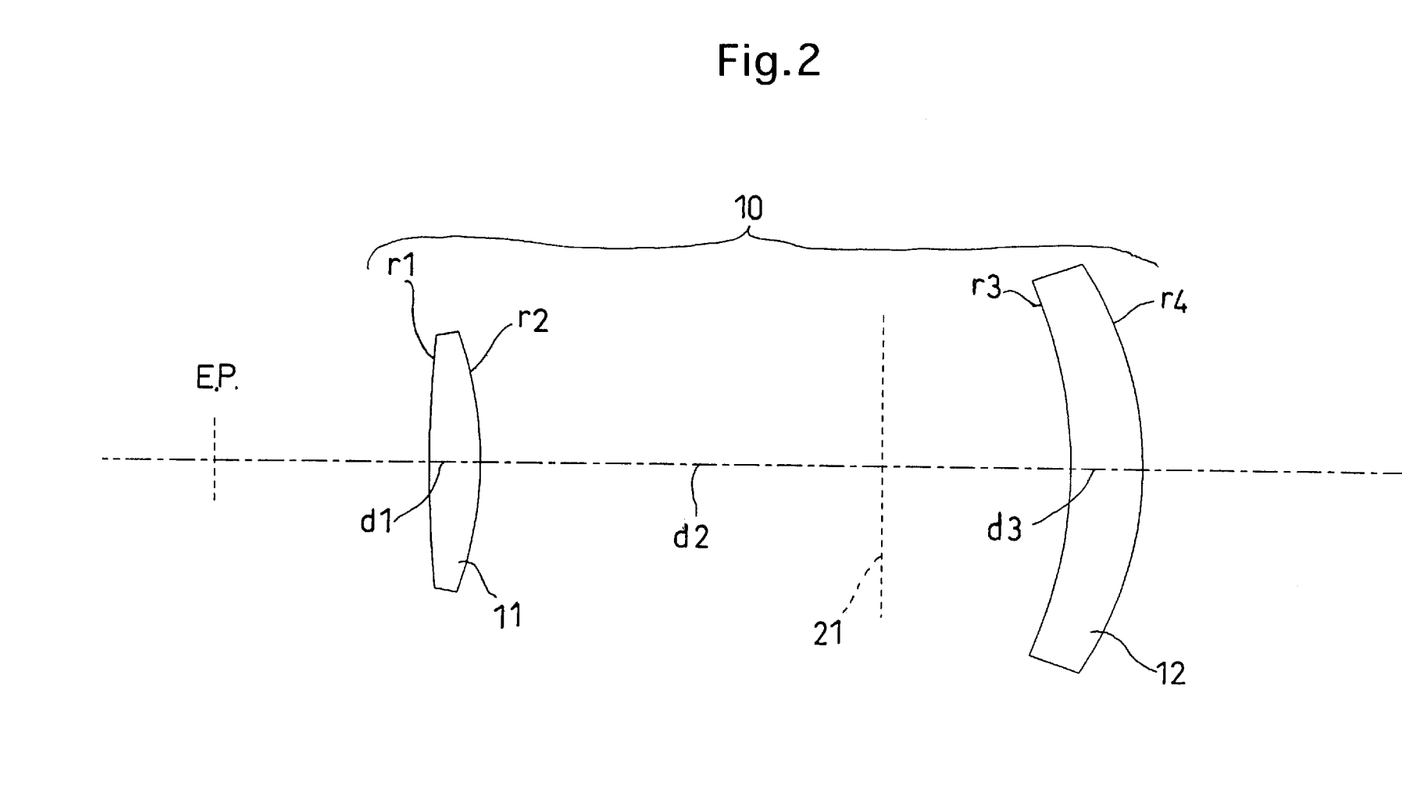
FIG. 2 is a lens arrangement of the eyepiece lens system shown in FIG. 1.
Figure 3A:
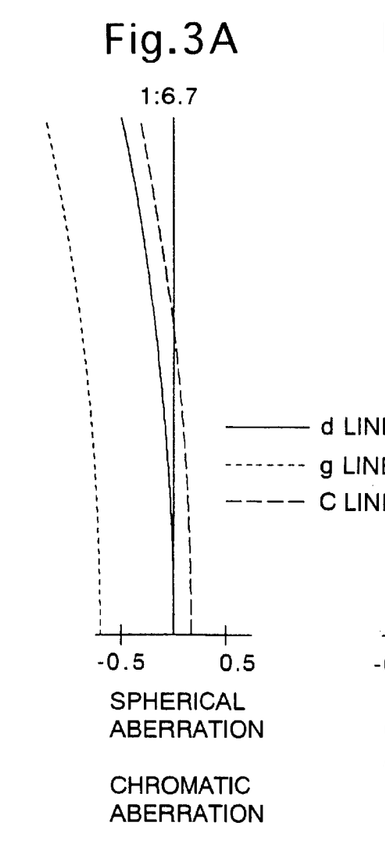
FIGS. 3A, 3B, 3C and 3D are aberration diagrams of the eyepiece lens system shown in FIG. 2.
Figure 3B:
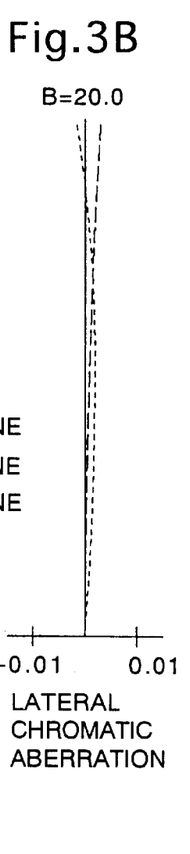
Figure 3C:
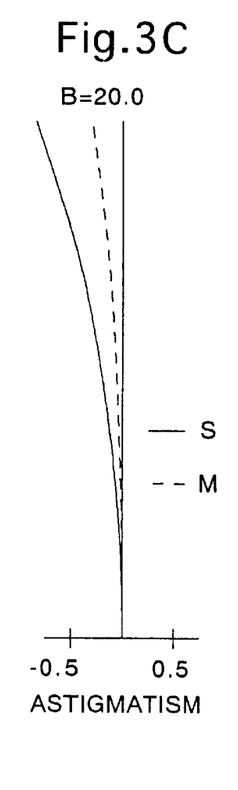
Figure 3D:
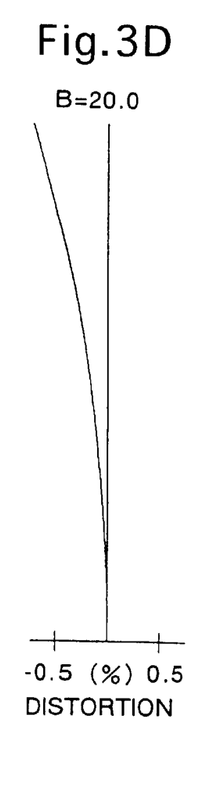

FIGS. 1 through 3D show the first embodiment of the eyepiece lens system. FIG. 1 is a lens arrangement in which both the eyepiece lens system and the objective lens system are shown as a combination. FIG. 2 is a lens arrangement of the eyepiece lens system. Table 1 shows the lens data thereof. FIGS. 3A, 3B, 3C and 3D are aberration diagrams of the eyepiece lens system shown in FIG. 2. In FIG. 2, 'E.P.' designates the eyepoint (pupil position).

TABLE 1 f = 20.0
B = 20.0
ER = 8.2 (= 0.41 f)
ER = 8.2 (= 0.41 f)

| Surface No. | R       | D     | N       | ν    |
|-------------|---------|-------|---------|------|
| 1           | 48.392  | 2.00  | 1.69680 | 55.5 |
| 2           | -13.880 | 22.54 | —       | —    |
| 3           | -17.612 | 2.79  | 1.84666 | 23.8 |
| 4           | -13.883 | —     | —       | —    |

[Embodiment 2]

Figure 5:
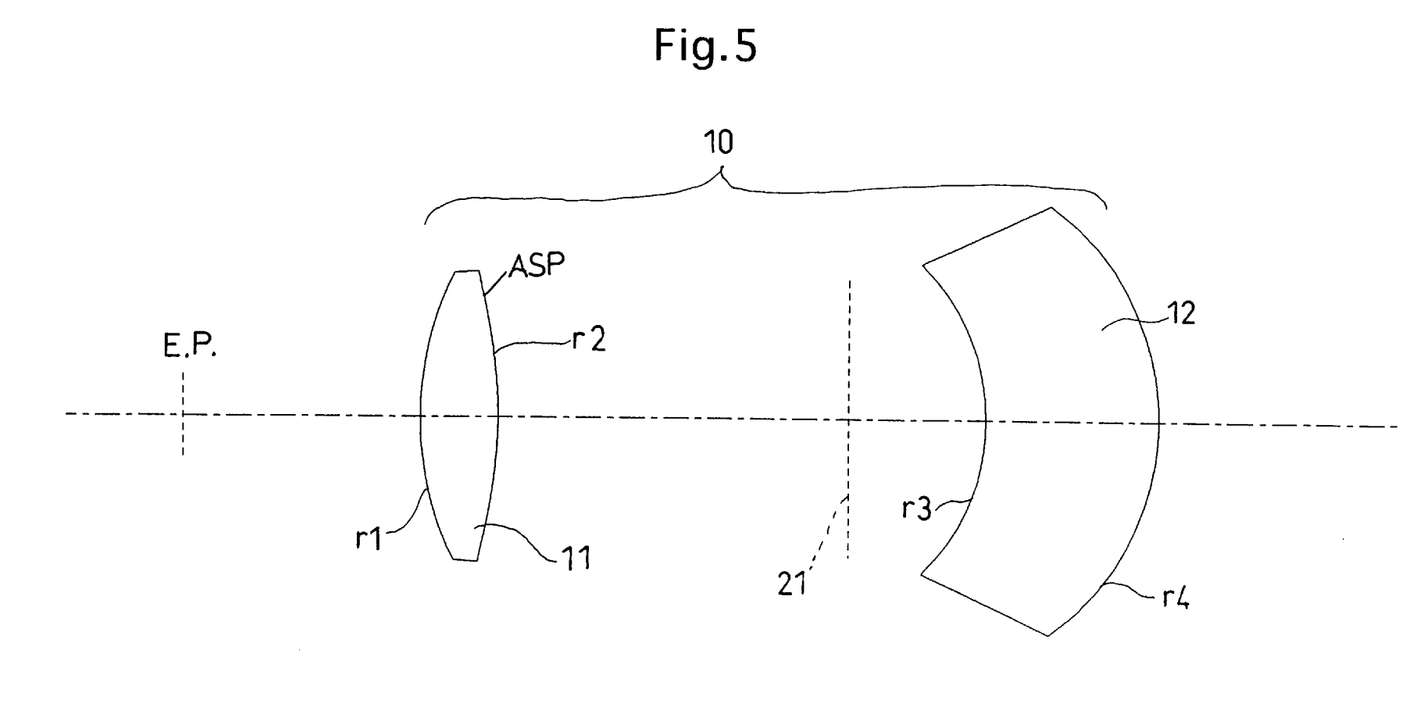
FIG. 5 is a lens arrangement of the eyepiece lens system shown in FIG. 4.
Figure 6A:
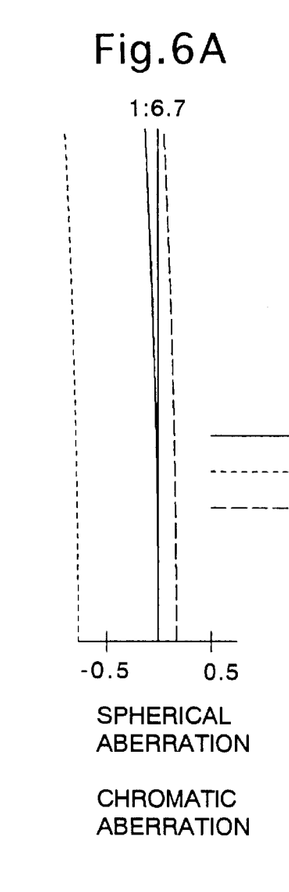
FIGS. 6A, 6B, 6C and 6D are aberration diagrams of the eyepiece lens system shown in FIG. 5.
Figure 6B:
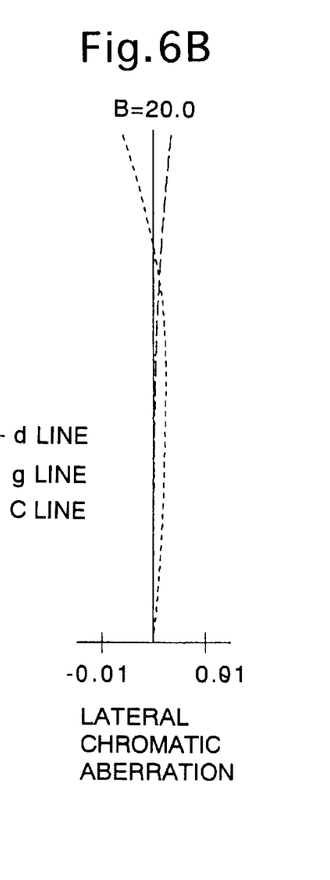
Figure 6C:
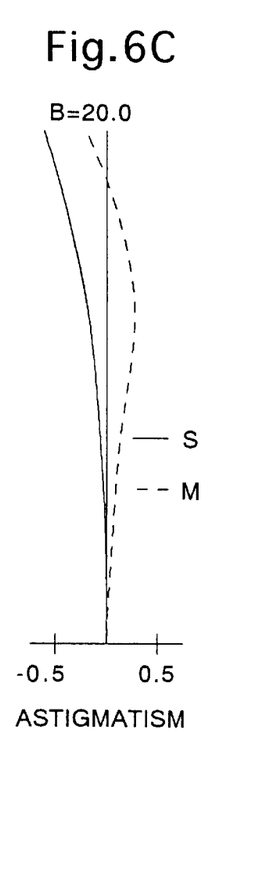
Figure 6D:
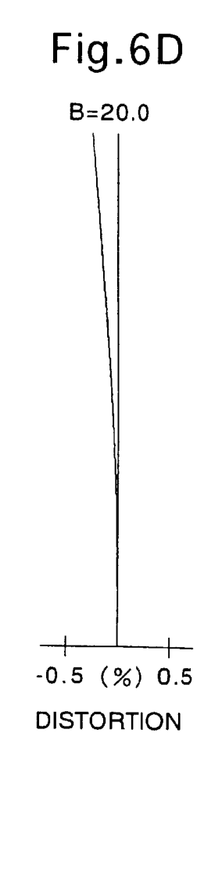

FIGS. 4 through 6D show the second embodiment of the eyepiece lens system. FIG. 4 is a lens arrangement in which both the eyepiece lens system and the objective lens system are shown as a combination. FIG. 5 is a lens arrangement of the eyepiece lens system. Table 2 shows the lens data thereof. FIGS. 6A, 6B, 6C and 6D are aberration diagrams of the eyepiece lens system shown in FIG. 5.

TABLE 2 f = 20.0
B = 20.0
ER = 9.0 (= 0.45 f)

| Surface No. | R       | D     | N       | ν    |
|-------------|---------|-------|---------|------|
| 1           | 12.220  | 3.00  | 1.49176 | 57.4 |
| 2*          | -15.790 | 18.54 | —       | —    |
| 3           | -8.359  | 6.62  | 1.58547 | 29.9 |
| 4           | -10.000 | —     | —       | —    |

*designates the aspherical surface which is rotationally symmetrical with respect to the optical axis.

Aspherical surface data (the aspherical surface coefficients not indicated are zero (0.00)):

| No.2 | K = 0.0 | A4 = 0.2135 × $10^{-3}$ |

[Embodiment 3]

Figure 8:
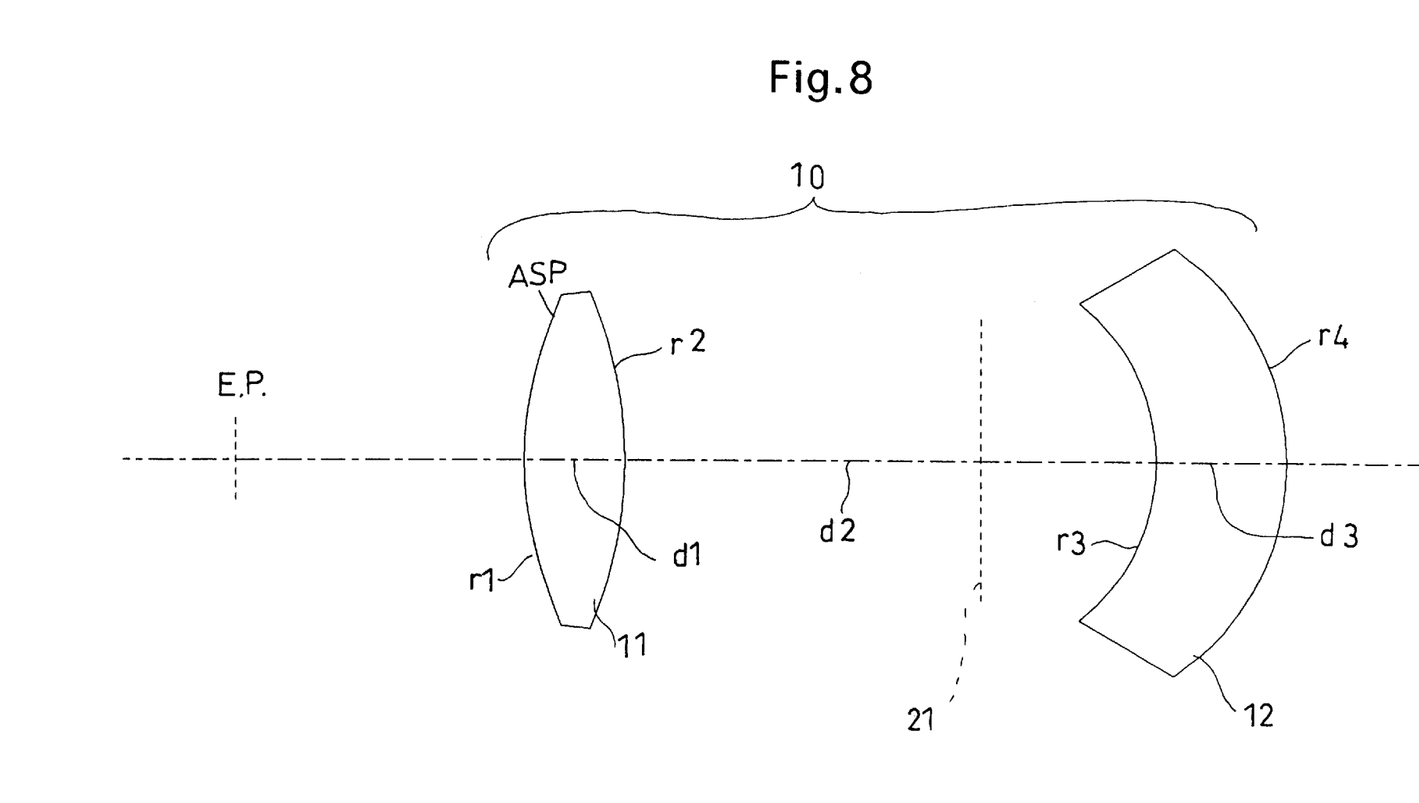
FIG. 8 is a lens arrangement of the eyepiece lens system shown in FIG. 7.
Figure 9A:
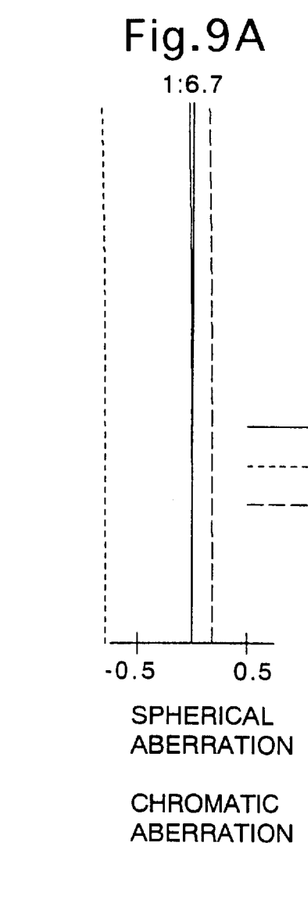
FIGS. 9A, 9B, 9C and 9D are aberration diagrams of the eyepiece lens system shown in FIG. 8.
Figure 9B:
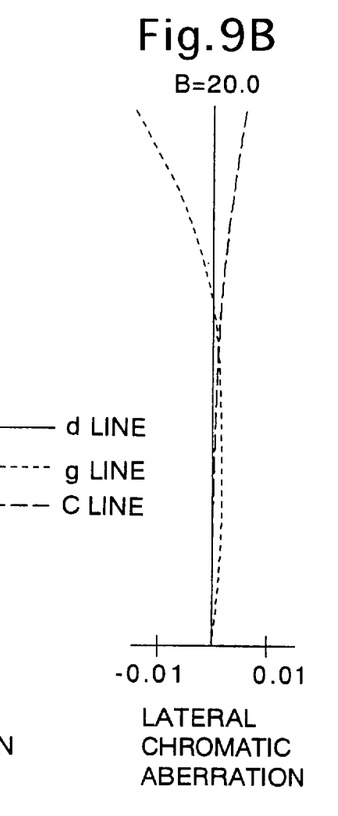
Figure 9C:
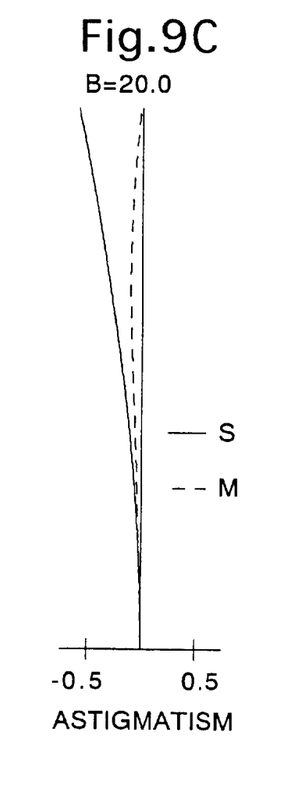
Figure 9D:
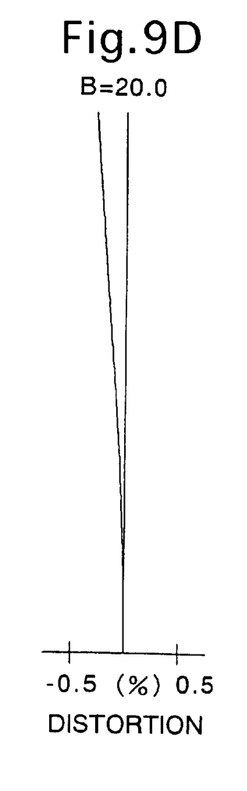

FIGS. 7 through 9D show the third embodiment of the eyepiece lens system. FIG. 7 is a lens arrangement in which both the eyepiece lens system and the objective lens system are shown as a combination. FIG. 8 is a lens arrangement of the eyepiece lens system. Table 3 shows the lens data thereof. FIGS. 9A, 9B, 9C and 9D are aberration diagrams of the eyepiece lens system shown in FIG. 8.

TABLE 3 f = 20.0
B = 20.0
ER = 11.0 (= 0.55 f)

TABLE 3-continued

| Surface No. | R       | D    | N       | ν    |
|-------------|---------|------|---------|------|
| 1*          | 12.690  | 3.80 | 1.49176 | 57.4 |
| 2           | -16.318 | 20.33| —       | —    |
| 3           | -7.607  | 5.00 | 1.84666 | 23.8 |
| 4           | -9.800  | —    | —       | —    |

*designates the aspherical surface which is rotationally symmetrical with respect to the optical axis.

Aspherical surface data (the aspherical surface coefficients not indicated are zero (0.00)):

| No. 1: | K = 0.0 | A4 = -0.1676 × $10^{-3}$ |

Table 4 shows the numeral values which correspond to each condition of each embodiment.

TABLE 4

|           | Embodiment 1 | Embodiment 2 | Embodiment 3 |
|-----------|--------------|--------------|--------------|
| Cond. (1) | 0.994        | 0.898        | 0.847        |
| Cond. (2) | 0.51         | 0.60         | 0.70         |
| Cond. (3) | 1.269        | 0.836        | 1.290        |
| Cond. (4) | 2.33         | 1.92         | 2.41         |

As can be understood from Table 4, in each embodiment, conditions (1) through (4) have been satisfied, and as shown in the aberration diagrams, aberrations have also been adequately corrected.

According to the above descriptions, an eyepiece lens system in which the eye relief is more than 0.4 f, lateral chromatic aberration is suitably corrected, and the apparent visual angle is about 40° can be obtained while the eyepiece lens system maintains a basic two-lens-element arrangement.

What is claimed is:

1. A negative ocular having a positive eye-side lens element positioned on the side of the user's eye and a positive field lens element positioned on the side of an object;

whereby an intermediate image formed by an objective lens system is positioned between said eye-side lens element and said field lens element, and whereby said eyepiece lens system satisfies the following conditions:

$$0.8 < L(1+S)/\{f_1(P+S)\} < 1.05$$

$$0.5 < S(1 - 1/P)/(1+S)$$

wherein $$S = \nu_1/\nu_2;$$

$$P = f_2/f_1;$$

$f_1$ designates the focal length of said eye-side lens element;

$f_2$ designates the focal length of said field lens element;

$\nu_1$ designates the Abbe number of the eye-side lens element;

$\nu_2$ designates the Abbe number of said field lens element; and

L designates the distance between the principal points of said field lens element and said eye-side lens element.

2. The negative ocular according to claim 1, wherein said field lens element is a meniscus lens element having the convex surface facing towards said object, and wherein said meniscus lens element satisfies the following condition:

$$0.7 < r_3/r_4 < 1.4$$

wherein $r_3$ designates the radius of curvature of the eye-side surface of said field lens element; and $r_4$ designates the radius of curvature of the object-side surface of said field lens element.

3. The negative ocular according to claim 1, wherein said eye-side lens element includes at least one aspherical surface which is formed to deviate towards the outside from the paraxial spherical surface which is considered to be a reference surface, and wherein the amount of asphericity increases along with an increase of the height from the optical axis towards the periphery of said eye-side lens element.

4. The negative ocular according to claim 1, wherein said negative ocular satisfies the following condition:

$$1.9 < S.$$

* * * * *